(12) United States Patent
Warburg et al.

(10) Patent No.: US 12,509,991 B2
(45) Date of Patent: Dec. 30, 2025

(54) TURBINE ENGINE WITH A BLADE ASSEMBLY HAVING A SET OF COOLING CONDUITS

(71) Applicant: General Electric Company, Evendale, OH (US)

(72) Inventors: Thomas P. Warburg, West Chester, OH (US); Zachary R. Noeth, Loveland, OH (US); Kelli Marie Fishback, Liberty Township, OH (US); Marie Myers, Cincinnati, OH (US); Zachary Daniel Webster, Cincinnati, OH (US); Kurt Thomas Whittington, Maineville, OH (US); Kirk D. Gallier, Liberty Township, OH (US); Jared Peter Buhler, Lynn, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/074,068

(22) Filed: Mar. 7, 2025

(65) Prior Publication Data
US 2025/0283413 A1    Sep. 11, 2025

Related U.S. Application Data

(60) Provisional application No. 63/562,542, filed on Mar. 7, 2024.

(51) Int. Cl.
*F01D 5/18*    (2006.01)
*F02C 7/12*    (2006.01)
*F01D 5/14*    (2006.01)

(52) U.S. Cl.
CPC ............... *F01D 5/18* (2013.01); *F02C 7/12* (2013.01); *F01D 5/147* (2013.01); *F05D 2260/20* (2013.01)

(58) Field of Classification Search
CPC ............ F01D 5/18; F01D 5/147; F01D 5/181
See application file for complete search history.

(56) References Cited

U.S. PATENT DOCUMENTS

| | | | | |
|---|---|---|---|---|
| 4,501,053 | A | * 2/1985 | Craig | ............... F01D 5/284 416/193 A |
| 5,462,405 | A | 10/1995 | Hoff et al. | |
| 5,993,155 | A | * 11/1999 | Endres | ............... F01D 5/187 416/96 R |

(Continued)

FOREIGN PATENT DOCUMENTS

EP    2037081 B1    12/2016

OTHER PUBLICATIONS

European Patent Office, "Extended European Search Report," issued in connection with European Patent Application No. 25162279.1, Jul. 11, 2025, 18 pages.

(Continued)

*Primary Examiner* — Gerald L Sung
(74) *Attorney, Agent, or Firm* — Hanley, Flight & Zimmerman, LLC

(57) ABSTRACT

A gas turbine engine having a blade assembly with a platform, an airfoil, and a shank. The airfoil has a plurality of cooling conduits, and the shank has a plurality of inlet passages to provide cooling fluid to the cooling conduits in the airfoil. The cooling fluid is vented through a plurality of cooling holes along the airfoil. The blade assembly has specific geometries that improve durability.

18 Claims, 10 Drawing Sheets

(56) References Cited

U.S. PATENT DOCUMENTS

| | | |
|---|---|---|
| 6,227,804 B1 | 5/2001 | Koga et al. |
| 9,810,070 B2 | 11/2017 | Johns et al. |
| 10,156,144 B2 | 12/2018 | Quach et al. |
| 11,401,821 B2 | 8/2022 | Krumanaker et al. |
| 11,746,666 B2 | 9/2023 | Kim et al. |
| 2003/0219338 A1* | 11/2003 | Heyward ................ F01D 5/081 |
| | | 416/96 R |
| 2009/0202339 A1 | 8/2009 | Torii et al. |
| 2014/0338364 A1 | 11/2014 | Johns et al. |
| 2016/0237833 A1* | 8/2016 | Tsypkaykin ............ F01D 5/081 |
| 2018/0128113 A1* | 5/2018 | Hoffman ................ F01D 9/041 |
| 2019/0284940 A1* | 9/2019 | Task ...................... C23C 16/403 |
| 2022/0025769 A1 | 1/2022 | Place et al. |
| 2022/0170376 A1 | 6/2022 | Hatta et al. |

OTHER PUBLICATIONS

European Patent Office, "Extended European Search Report," issued in connection with European patent Application No. 25162334.4, dated Jul. 15, 2025, 17 pages.

* cited by examiner

TURBINE ENGINE WITH A BLADE ASSEMBLY HAVING A SET OF COOLING CONDUITS

CROSS-REFERENCE TO RELATED APPLICATIONS

This patent claims the benefit of U.S. Provisional Patent Application No. 63/562,542, titled "TURBINE ENGINE WITH A BLADE ASSEMBLY HAVING A SET OF COOLING CONDUITS," which was filed on Mar. 7, 2024. Priority to U.S. Provisional Patent Application No. 63/562,542 is hereby claimed.

TECHNICAL FIELD

The present subject matter relates generally to a blade assembly for a turbine engine, and more specifically to a turbine engine with a blade assembly having a set of cooling conduits.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited to generate hot combustion gases. The combustion gases are channeled to the turbine, which extracts energy from the combustion gases for powering the compressor and fan, if used, as well as for producing useful work to propel an aircraft in flight or to power a load, such as an electrical generator.

During operation of the gas turbine engine, various systems generate a relatively large amount of heat and stress. For example, a substantial amount of heat or stress can be generated during operation of the thrust generating systems, lubrication systems, electric motors and/or generators, hydraulic systems or other systems. A design that mitigates heat loads and/or stresses on an engine component is advantageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
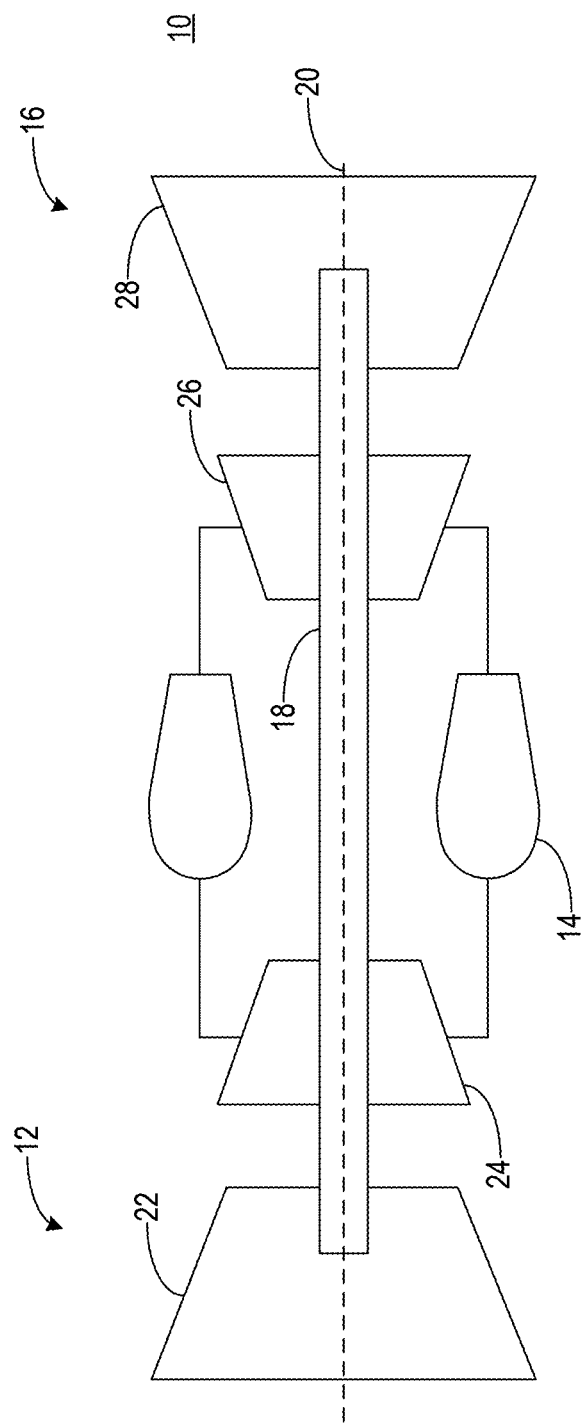
FIG. 1 is a schematic cross-sectional view of a gas turbine engine, in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to a blade assembly having conduits located within the blade assembly. Specifically, the blade assembly includes an airfoil with a plurality of cooling conduits and a shank with a plurality of inlet passages. The airfoil also includes cooling holes fluidly coupled to the plurality of cooling conduits within the airfoil.

The blade assembly may be a blade assembly in a turbine section of a gas turbine engine. For example, the blade assembly may be a stage one blade assembly of a high pressure turbine, which typically experiences the highest thermal and mechanical stresses.

The shank may be used to attach the blade assembly to a turbine disk. In some implementations the shank is formed as a dovetail received in the turbine disk. A platform of the blade assembly together with other circumferentially arranged platforms and seals of other blade assemblies define a substantially continuous annular ring that limits (e.g., prevents, reduces) hot gas leakage from the flow path into the turbine disk cavity. The airfoil extends radially from the platform, away from the turbine disk while the shank extends radially from the platform, toward the turbine disk.

High engine temperatures and operational forces impart relatively large thermal and mechanical stresses on the blade assemblies. In addition, the cooling conduits and the inlet passages in the blade assembly result in stress redistribution. For example, the size of the cooling conduits and the inlet passages affects the thickness of the airfoil wall and the shank wall, which affects stress distribution in the blade assembly. Relatively large stresses can contribute to an unexpected or premature part replacement. Therefore, there is a need for a blade assembly with greater durability to increase time on wing.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

As used herein, a "stage" of either a compressor or a turbine of a gas turbine engine is a set of blade assemblies and an adjacent set of vane assemblies, with both sets of the blade assemblies and the vane assemblies circumferentially arranged about an engine centerline. A pair of circumferentially adjacent vanes in the set of vane assemblies are referred to as a nozzle. The blade assemblies rotate relative to the engine centerline. In one example, the blade assemblies are mounted to a rotating structure, such as a disk.

As used herein, the word "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", and "fourth" can be used interchangeably to distinguish one component from another and are not intended to signify location or importance of the individual components.

As used herein, a "set" or a set of elements can include any number of said elements, including one.

As used herein, the terms "forward" and "aft" refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

As used herein, the terms "upstream" and "downstream" refer to a location along a fluid flowpath with respect to a direction of fluid flow along the fluid flow path and reference location along the fluid flowpath.

As used herein, the term "fluid" refers to a gas or a liquid and "fluidly coupled" means a fluid can flow between the coupled regions.

As used herein, forms "a", "an", and "the" include plural references unless the context clearly dictates otherwise.

As used herein, a radial direction (denoted "R") is a direction that is perpendicular to a base plane on a shank of a blade assembly.

As used herein, an axial direction (denoted "A") is a direction that is perpendicular to a shank leading-edge plane on the shank of the blade assembly and perpendicular to the axial direction.

As used herein, a tangential direction (denoted "T") is a direction that is perpendicular to the radial direction and the axial direction.

A stator rotor seal radius (denoted "SRSR") is a radius of curvature of an upper edge of a stator rotor seal on a blade assembly.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. The term redline EGT is sometimes also referred to as an indicated turbine exhaust gas temperature or indicated turbine temperature.

The term redline core speed (referred to herein as "redline CS") refers to a maximum rotational speed of a gas turbine engine permitted at takeoff as documented in the FAA-type certificate data sheet. For example, the redline core speed CS is the rate at which the drive shaft for the gas turbine engine rotates, which defines the rotational speed of the particular blade assembly within the gas turbine engine.

As used herein "cooling conduit" refers to a flow path that conveys a cooling fluid that is formed in a blade assembly.

As used herein, a "cooling conduit portion" refers to a discrete portion of a cooling conduit at a cross-sectional plane of a blade assembly.

As used herein "inlet passage" refers to a cooling conduit formed in a shank of the blade assembly.

As used herein a "leading-edge inlet passage" refers to the inlet passage in the shank of the blade assembly that is adjacent to the leading edge of the blade assembly.

As used herein a "trailing-edge inlet passage" refers to the inlet passage in the shank of the blade assembly that is adjacent to the trailing edge of the blade assembly.

As used herein "a middle inlet passage" refers to an inlet passage that is between a leading-edge inlet passage and a trailing-edge inlet passage.

As used herein, "a base plane" of a blade assembly refers to the plane defined by the base of a shank of the blade assembly.

A number of cooling conduits fed by middle inlet passage (denoted "$N_1$") refers to the number of distinct cooling conduits that are downstream of the middle inlet passage.

A number of cooling conduit portions spanning pressure surface to suction surface (denoted "$N_2$") refers to the number of cooling conduit portions that span from the pressure surface to the suction side of a blade assembly and are fed from the middle inlet passage of a blade assembly.

As used herein, the maximum normalized cooling conduit portion area (denoted "$A_{max}$") refers to the greatest normalized area of the cross-sectional areas of a set of cooling conduit portions of the middle inlet passage.

A degree of change of cooling conduit portions along a suction side of an airfoil of the blade assembly (denoted "DCCPASS") refers to an angle measured between the lines along the suction side of cooling conduit portions of the middle inlet passage at two cross-sectional planes.

All measurements referred to herein are taken of the blade assembly prior to use or as a cold component.

Referring now to the drawings, FIG. 1 is a schematic view of a gas turbine engine 10. As a non-limiting example, the gas turbine engine 10 can be used on an aircraft. The gas turbine engine 10 includes an engine core extending along an engine centerline 20 and including, at least, a compressor section 12, a combustor 14, and a turbine section 16 in serial flow arrangement. In some examples, the gas turbine engine 10 includes a fan (not shown) that is driven by the engine core to provide thrust and provides air to the compressor section 12. The gas turbine engine 10 includes a drive shaft 18 that rotationally couples the fan, compressor section 12, and turbine section 16, such that rotation of one affects the rotation of the others, and defines a rotational axis along the engine centerline 20 for the gas turbine engine 10.

In the illustrated example, the compressor section 12 includes a low-pressure (LP) compressor 22 and a high-pressure (HP) compressor 24 serially fluidly coupled to one another. The turbine section 16 includes an HP turbine 26 and an LP turbine 28 serially fluidly coupled to one another. The drive shaft 18 operatively couples the LP compressor 22, the HP compressor 24, the HP turbine 26 and the LP turbine 28 to one another. In some implementations, the drive shaft 18 includes an LP spool (not illustrated) and an HP spool (not illustrated), where the LP spool couples the LP compressor 22 to the LP turbine 28, and the HP spool couples the HP compressor 24 to the HP turbine 26.

The compressor section 12 includes a plurality of axially spaced stages. Each stage includes a set of circumferentially-spaced rotating blade assemblies and a set of circumferentially-spaced stationary vane assemblies. In one configuration, the compressor blade assemblies for a stage of the compressor section 12 are mounted to a disk, which is mounted to the drive shaft 18. Each set of blade assemblies for a given stage can have its own disk. In one implementation, the vane assemblies of the compressor section 12 are mounted to a casing which extends circumferentially about the turbine engine 10. In a counter-rotating gas turbine engine, the vane assemblies are mounted to a drum, which is similar to the casing, except the drum rotates in a direction opposite the blade assemblies, whereas the casing is stationary. It will be appreciated that the representation of the compressor section 12 is merely schematic. The number of stages can vary.

Similar to the compressor section 12, the turbine section 16 includes a plurality of axially spaced stages, with each stage having a set of circumferentially-spaced, rotating blade assemblies and a set of circumferentially-spaced, stationary vane assemblies. In one configuration, the turbine blade assemblies for a stage of the turbine section 16 are mounted to a disk which is mounted to the drive shaft 18. Each set of blade assemblies for a given stage can have its own disk. In one implementation, the vane assemblies of the turbine section are mounted to the casing in a circumferential manner.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the gas turbine engine 10, ambient or atmospheric air is drawn into the compressor section 12 via the fan, upstream of the compressor section 12, where the air is compressed defining a pressurized air. The pressurized air then flows into the combustor 14 where the pressurized air is mixed with fuel and ignited, thereby generating hot combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan and the LP compressor 22. The pressurized airflow and the combustion gases together define a working airflow that flows through the fan, compressor section 12, combustor 14, and turbine section 16 of the gas turbine engine 10.

Figure 2:
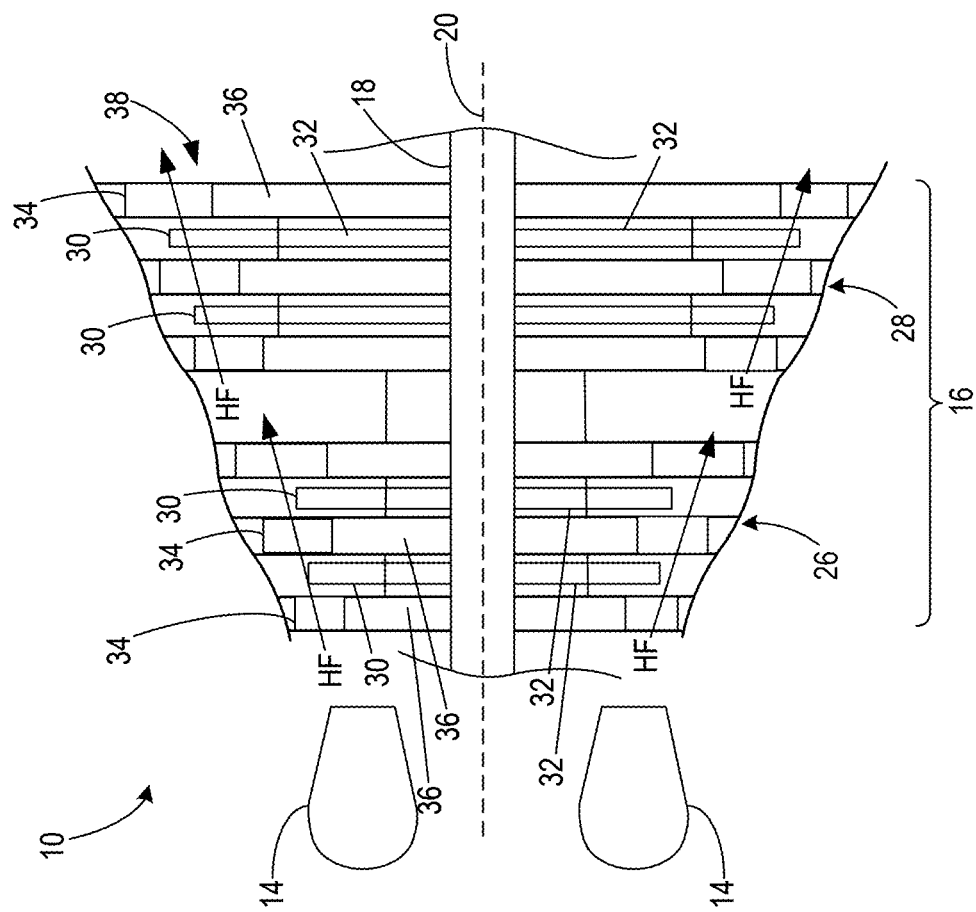
FIG. 2 is a schematic cross-sectional view of a turbine section of the gas turbine engine of FIG. 1, in accordance with an exemplary embodiment of the present disclosure.

Turning to FIG. 2, a portion of the turbine section 16 is schematically illustrated. The turbine section 16 includes sets of blade assemblies 30 circumferentially mounted to corresponding disks 32. The number of individual blade assemblies of the set of blade assemblies 30 mounted to each disk 32 may vary. While shown schematically in FIG. 2, it should be understood that the turbine section 16 can be a single stage turbine, or can include additional stages as shown.

Stationary vane assemblies 34 are mounted to a stator ring 36 located distally exterior of each of the disks 32. A nozzle 38 is defined by the space between circumferentially-adjacent pairs of vane assemblies 34. The number of nozzles 38 provided on the stator ring 36 may vary.

During operation of the gas turbine engine 10, a flow of hot gas or heated fluid flow (denoted "HF") exits the combustor 14 and enters the turbine section 16. The heated fluid flow HF is directed through the nozzles 38 and impinges on the blade assemblies 30, which rotates the blade assemblies 30 circumferentially around the engine centerline 20 and cause rotation of the drive shaft 18. The engine core is configured to generate a redline exhaust gas temperature (EGT) in a range of 988 degrees Celsius (° C.) to 1120° C.

Figure 3:
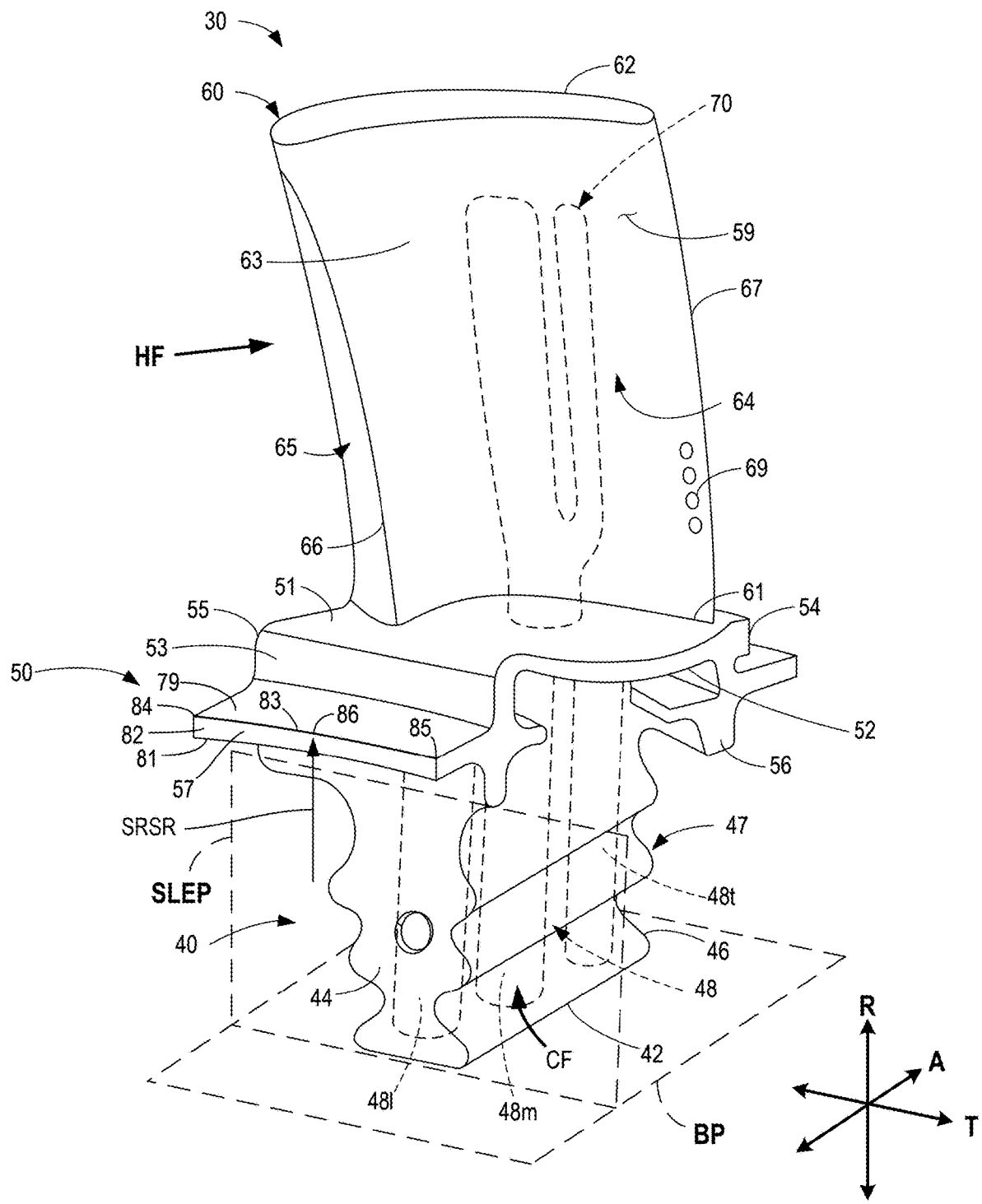
FIG. 3 is a perspective view of a blade assembly including a middle inlet passage for use in the gas turbine engine of FIG. 1, in accordance with an exemplary embodiment of the present disclosure.

FIG. 3 is a perspective view of a single blade assembly 30 for the gas turbine engine 10 (FIG. 1). The blade assembly 30 may correspond to a stage one blade assembly of the HP turbine 26. The blade assembly 30 includes a shank 40, a platform 50, and an airfoil 60 (also referred to as a blade or blade portion). The blade assembly 30 can be constructed as a single unitary part or component (e.g., a monolithic structure). In other examples, the shank 40, the platform 50, and/or the airfoil 60 can be constructed as separate parts or components that are coupled together to form the blade assembly 30.

A directional reference system is illustrated in FIG. 3. The shank 40 extends between a base 42 and the platform 50. The base 42 of the shank 40 is a flat surface that defines a plane, referred to herein as the base plane (denoted "BP"). A radial direction (denoted "R") of the blade assembly 30 is a direction that is perpendicular to the base plane BP. Further, the shank 40 extends between a shank leading-edge 44 and a shank trailing-edge 46. The shank leading-edge 44 is a flat surface that defines a plane, referred herein as the shank leading-edge plane (denoted "SLEP"). An axial direction (denoted "A") of the blade assembly 30 is a direction that is perpendicular to the shank leading-edge plane SLEP. A tangential direction (denoted "T") is a direction perpendicular to both the radial direction R and the axial direction A.

The shank 40 is configured, by way of non-limiting example as a dovetail 47, to mount to the disk 32 (FIG. 2) of the engine 10 in order to rotatably drive the blade assembly 30. The shank 40 includes a plurality of inlet passages 48 (shown in dashed lines) for receiving a cooling fluid (denoted "CF") (e.g., bleed air) to cool the blade assembly 30. In the illustrated example, the plurality of inlet passages 48 includes a leading-edge inlet passage 48*l*, a middle inlet passage 48*m*, and a trailing-edge inlet passage 48*t*. Each of the inlet passages 48*l*, 48*m*, 48*t* extends between the base 42 and one or more cooling conduits in the airfoil 60, disclosed in further detail herein. The inlet passages 48*l*, 48*m*, 48*t* receive the cooling fluid CF at the base 42. The cooling fluid CF flows through the inlet passages 48*l*, 48*m*, 48*t* and into the one or more cooling conduits in the airfoil 60. While in this example there are three inlet passages, in other examples, the shank 40 can include more or fewer inlet passages.

The airfoil 60 extends radially outward from the platform 50 to define a root 61, connected to the platform 50, and a tip 62 opposite the root 61. Additionally, the airfoil 60 includes an outer wall 63 defining an exterior surface 59 defining a pressure side 64 and a suction side 65 opposite the pressure side 64. The airfoil 60 extends between an airfoil leading-edge 66 and an airfoil trailing-edge 67 downstream from the airfoil leading-edge 66. The airfoil leading-edge 66 and the airfoil trailing-edge 67 separate the pressure side 64 from the suction side 65. In the illustrated example, the blade assembly 30 has a plurality of cooling conduits 70 (shown in dashed lines) formed within the airfoil 60. Further, the blade assembly 30 has one or more cooling holes 69 formed in the outer wall 63 of the airfoil 60 to fluidly couple the plurality of cooling conduits 70 within the airfoil 60 to an exterior of the blade assembly 30. In the illustrated example, the cooling holes 69 are near the airfoil trailing-edge 67 along the pressure side 64. In other examples, the cooling holes 69 can be disposed in other locations. The plurality of cooling conduits 70 can include multiple conduits that extend radially through the airfoil 60. In some examples, one or more of the cooling conduits 70 are fluidly coupled to certain ones of the inlet passages 48*l*, 48*m*, 48*t*.

The platform 50 has a first surface 51, referred to as an upper surface, and a second surface 52, referred to as a lower surface, opposite the upper surface 51. The airfoil 60 is coupled to and extends radially outward from the upper surface 51, and the shank 40 is coupled to and extends radially inward from the lower surface 52. The platform 50 extends between a platform leading-edge 53 and a platform trailing-edge 54, opposite the platform leading-edge 53, in the axial A direction. The platform 50 further extends between a first slashface 55 and a second slashface 56, opposite the first slashface 55, in the tangential T direction. When assembled, consecutive blade assemblies 30 are arranged in a circumferential direction about the engine centerline 20 (FIG. 1) with sequential slashfaces 55, 56 facing each other.

During operation of the gas turbine engine 10, the heated fluid flow HF flows along the blade assembly 30. The airfoil leading-edge 66 is defined by a stagnation point with respect to the heated fluid flow HF. The heated fluid flow HF flows generally in the axial direction, from forward to aft, while the local directionality can vary as the heated fluid flow HF is driven or turned within the gas turbine engine 10. The cooling fluid flow CF is fed to the plurality of inlet passages 48 and flows into the plurality of cooling conduits 70 to cool the airfoil 60. The cooling fluid flow CF is provided throughout the airfoil 60 and exhausted from the plurality of cooling conduits 70 via the cooling holes 69 as a cooling film. Multiple blade assemblies 30 are arranged circumferentially such that the platforms 50 of the blade assemblies 30 form a continuous ring. The platform 50 helps to radially contain the heated fluid flow HF to protect the disk 32. The platform 50 acts to seal the space radially inward of the platform 50 between the flow path of the heated fluid flow H and the disk 32 (FIG. 2). The disk 32 requires significant cooling to ensure the durability of the HP turbine 26 components.

Materials used to form the blade assembly 30 include, but are not limited to, steel, refractory metals such as titanium, or superalloys based on nickel, cobalt, or iron, ceramic matrix composites, or combinations thereof. The structures can be formed by a variety of methods, including additive manufacturing, casting, electroforming, or direct metal laser melting, in non-limiting examples.

As shown in FIG. 3, the platform 50 has a stator rotor seal 57 that extends axially forward from the platform leading-edge 53. The stator rotor seal 57 facilitates sealing of a forward buffer cavity (not shown) defined within the rotor assembly. The stator rotor seal 57 has an upper surface 79, a lower surface 81 opposite the upper surface 79, and a forward surface 82 between the upper surface 79 and the lower surface 81. The stator rotor seal 57 has an upper edge 83 between the upper surface 79 and the forward surface 82. The upper edge 83 is curved or arc-shaped. In particular, the upper edge 83 is curved between a first end point 84 at the first slashface 55 and a second end point 85 at the second slashface 56. The upper edge 83 of stator rotor seal 57 has a center point 86 that forms the peak of the arc. The upper edge 83 of the stator rotor seal 57 has a radius of curvature, referred to herein as a stator rotor seal radius (denoted "SRSR"). The center of the radius of curvature mis the engine centerline 20 (FIG. 1).

Figure 4:
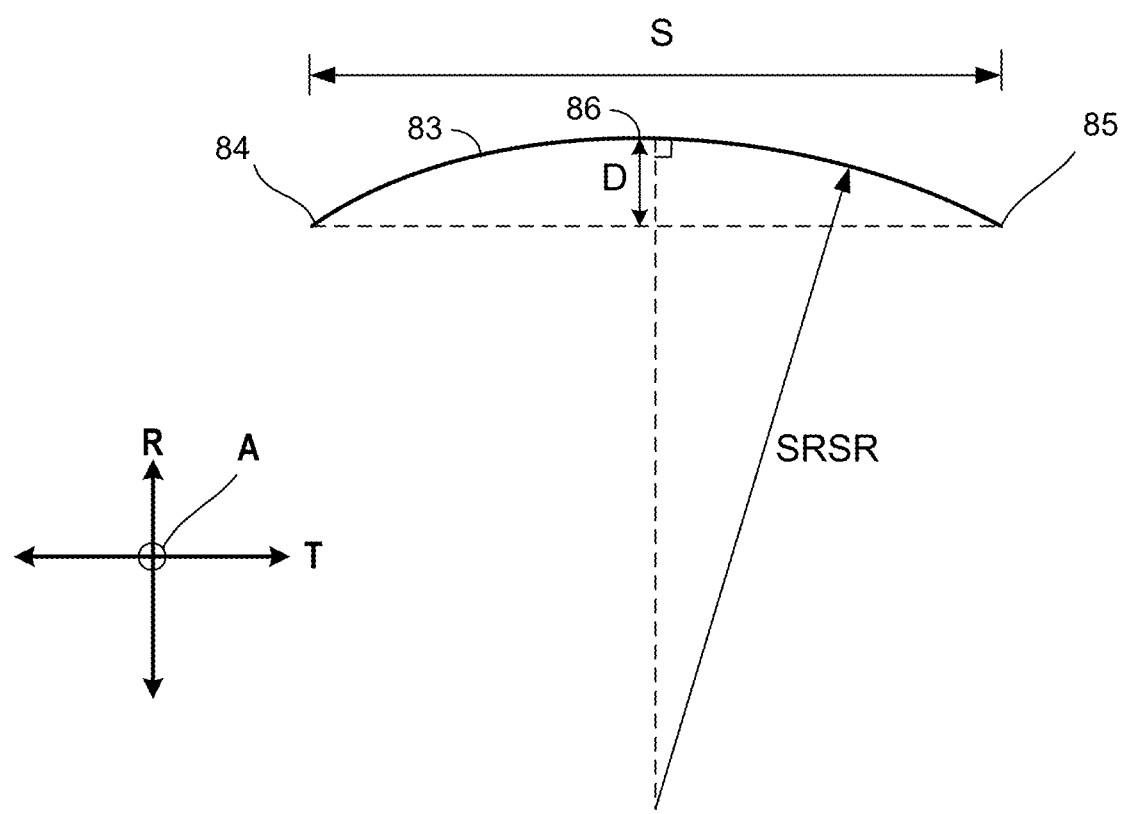
FIG. 4 is a schematic used to calculate a stator rotor seal radius of the blade assembly of FIG. 3.

As shown in FIG. 4, the SRSR (i.e., the radius of curvature of the upper edge 83 of the stator rotor seal 57) can be calculated using the straight-line distance(S) between the two the end points 84, 85, and the maximum deflection (D), in the radial R direction, between the two end points 84, 85 and the center point 86 of the arc. The SRSR can be calculated using $SRSR=(D/2)+(S^2/(8\times D))$.

Figure 5:
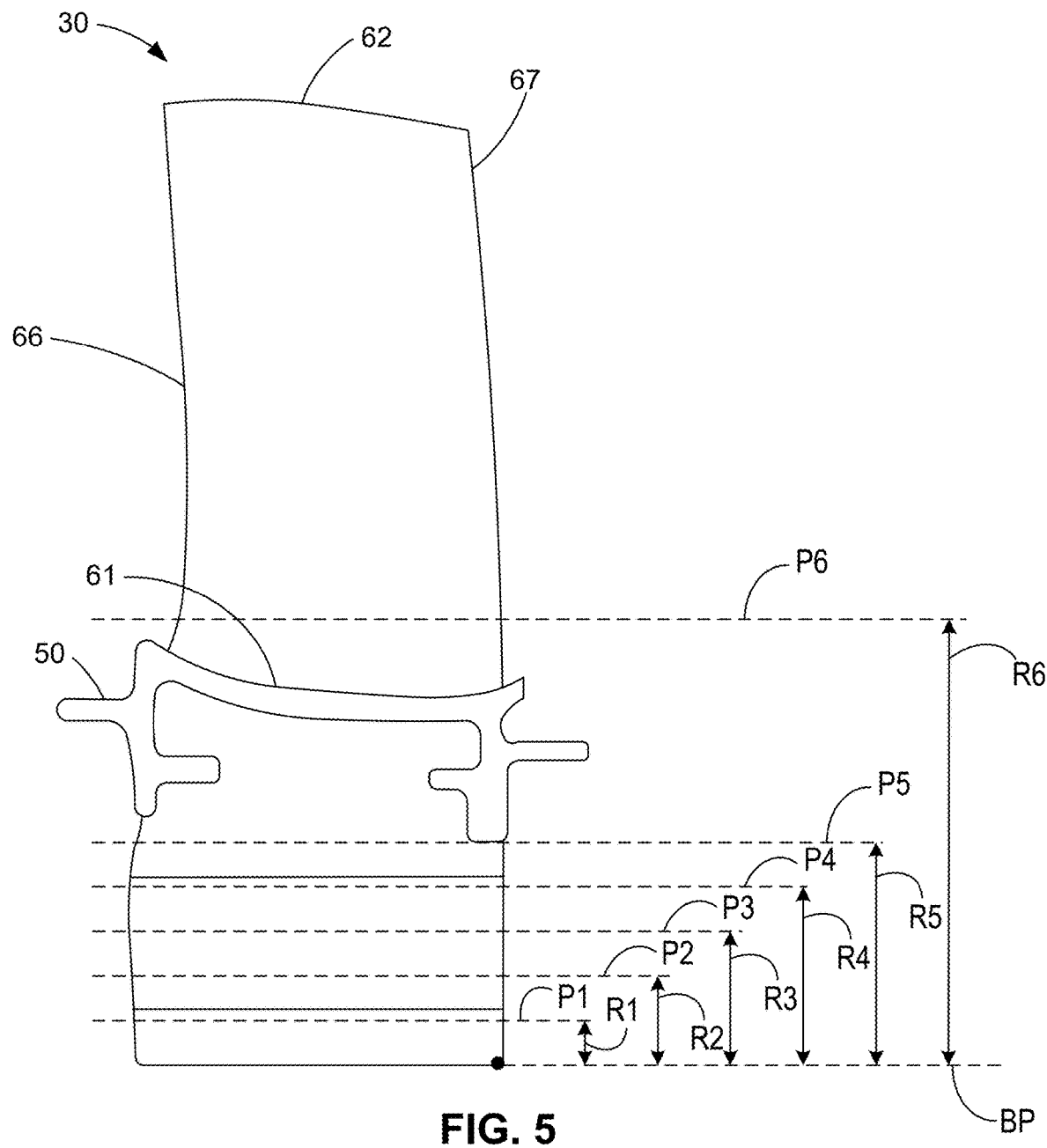
FIG. 5 is a side view of the blade assembly of FIG. 3 showing multiple planes, in accordance with an exemplary embodiment of the present disclosure.

FIG. 5 is a side view of the blade assembly 30. As disclosed above, the base plane BP is a plane defined by the base 42 and is perpendicular to the radial direction R. A first plane (denoted "P1") is parallel to the base plane BP and is located at a first radial distance (denoted "R1") from the base plane BP. A second plane (denoted "P2") is parallel to the base plane BP and is located at a second radial distance (denoted "R2") from the base plane BP. A third plane (denoted "P3") is parallel to the base plane BP and is located at a third radial distance (denoted "R3") from the base plane BP. A fourth plane (denoted "P4") is parallel to the base plane BP and is located at a fourth radial distance (denoted "R4") from the base plane. A fifth plane (denoted "P5") is parallel to the base plane BP and is located at a fifth radial distance (denoted "R5") from the base plane. A sixth plane (denoted "P6") is parallel to the base plane BP and is located at a sixth radial distance (denoted "R6") from the base plane.

Each of the planes P1, P2, P3, P4, P5, P6 extend perpendicular to the radial direction R. The first radial distance R1 is less than the second radial distance R2, which is less than the third radial distance R3, which is less than the fourth radial distance R4, which is less than fifth radial distance, which is less than the sixth radial distance: R1<R2<R3<R4<R5<R6. Table 1 includes the radial distances, R1, R2, R3, R4, R5, R6 of the planes, P1, P2, P3, P4, P5, P6 from the base plane, BP.

TABLE 1

| Plane | Radial Distance | Distance from Base Plane |
|---|---|---|
| P1 | R1 | 0.0167 meters |
| P2 | R2 | 0.0197 meters |
| P3 | R3 | 0.0215 meters |
| P4 | R4 | 0.0234 meters |
| P5 | R5 | 0.0245 meters |
| P6 | R6 | 0.0449 meters |

The first plane P1, the second plane P2, the third plane P3, the fourth plane P4, and the fifth plane P5 extend through the shank 40. The sixth plane P6 extends through the airfoil 60. The platform 50, the root 61, the tip 62, the airfoil leading-edge 66, and the airfoil trailing edge 67 are labeled in FIG. 5.

Figure 6:
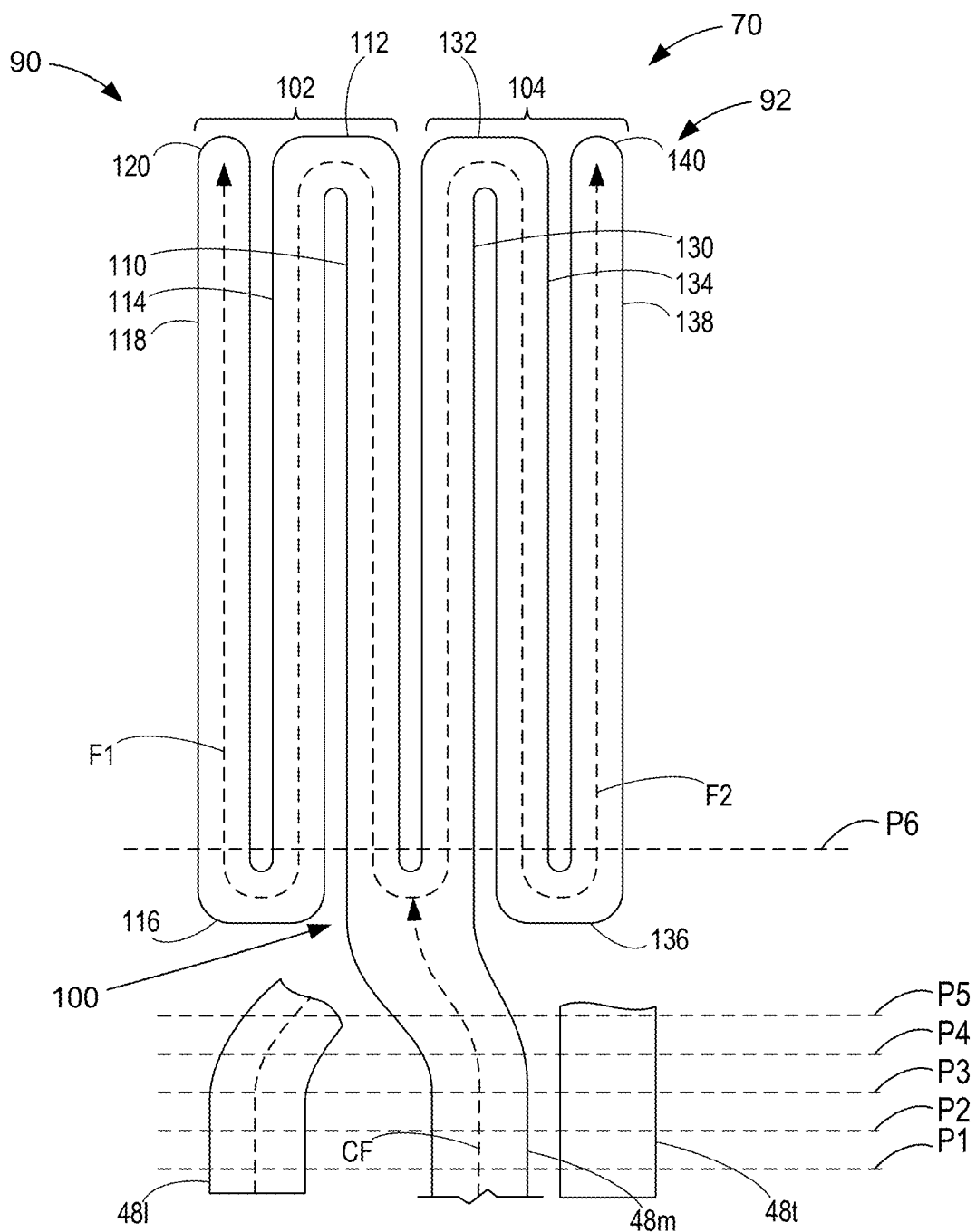
FIG. 6 is a side schematic view of a cooling circuit of the blade assembly of FIG. 3.

FIG. 6 is a schematic side view of a cooling circuit 90 of the blade assembly 30 of FIGS. 3-5. The cooling circuit 90 includes the leading inlet passages 48*l*, the middle inlet passage 48*m*, and the aft inlet passage 48*t* of FIG. 3. In FIG. 6, the inlet passages 48*l*, 48*m*, 48*t* continue to the cooling conduits 70 of FIG. 3. In FIG. 6, the middle inlet passage 48*m* leads to a middle conduit 92 of the cooling conduits 70. It should be appreciated that the leading inlet passages 48*l* and the aft inlet passage 48*t* also lead to cooling conduits of the cooling conduit 70, which are not illustrated in FIG. 6 to avoid obscuring the middle conduit 92. In FIG. 6, the planes P1, P2, P3, P4, P5, P6 of FIG. 5 are labeled.

In FIG. 6, the middle inlet passage 48m includes a splitter section 100. The middle conduit 92 includes a forward serpentine cooling conduit 102 and an aft serpentine cooling conduit 104, which branches off from the middle inlet passage 48m at the splitter section 100. The cooling flow (CF) flows through the middle inlet passage 48m is divided at the splitter section 100 into a first flow F1 through the forward serpentine cooling conduit 102 and a second flow F2 flows through the aft serpentine cooling conduit 104.

The forward serpentine cooling conduit 102 includes a first forward section 110 defined from the splitter section 100 to a first forward bend 112, a second forward section 114 defined from the first forward bend 112 to a second forward bend 116, and a third forward section 118 defined from the second forward bend 116 to a forward end 120. The aft serpentine cooling conduit 104 includes a first aft section 130 defined from the splitter section 100 to a first aft bend 132, a second aft section 134 defined from the first aft bend 132 to a second aft bend 136, and a third aft section 138 defined from the second aft bend 136 to an aft end 140. The quantity (i.e., number) of conduits fed by the middle inlet passage 48m (denoted "$N_1$") refers to the number of distinct cooling conduits that are downstream of the middle inlet passage 48m. In FIG. 6, the middle inlet passage 48m feeds two distinct cooling conduits, namely the forward serpentine cooling conduit 102 and the aft serpentine cooling conduit 104.

Figure 7:
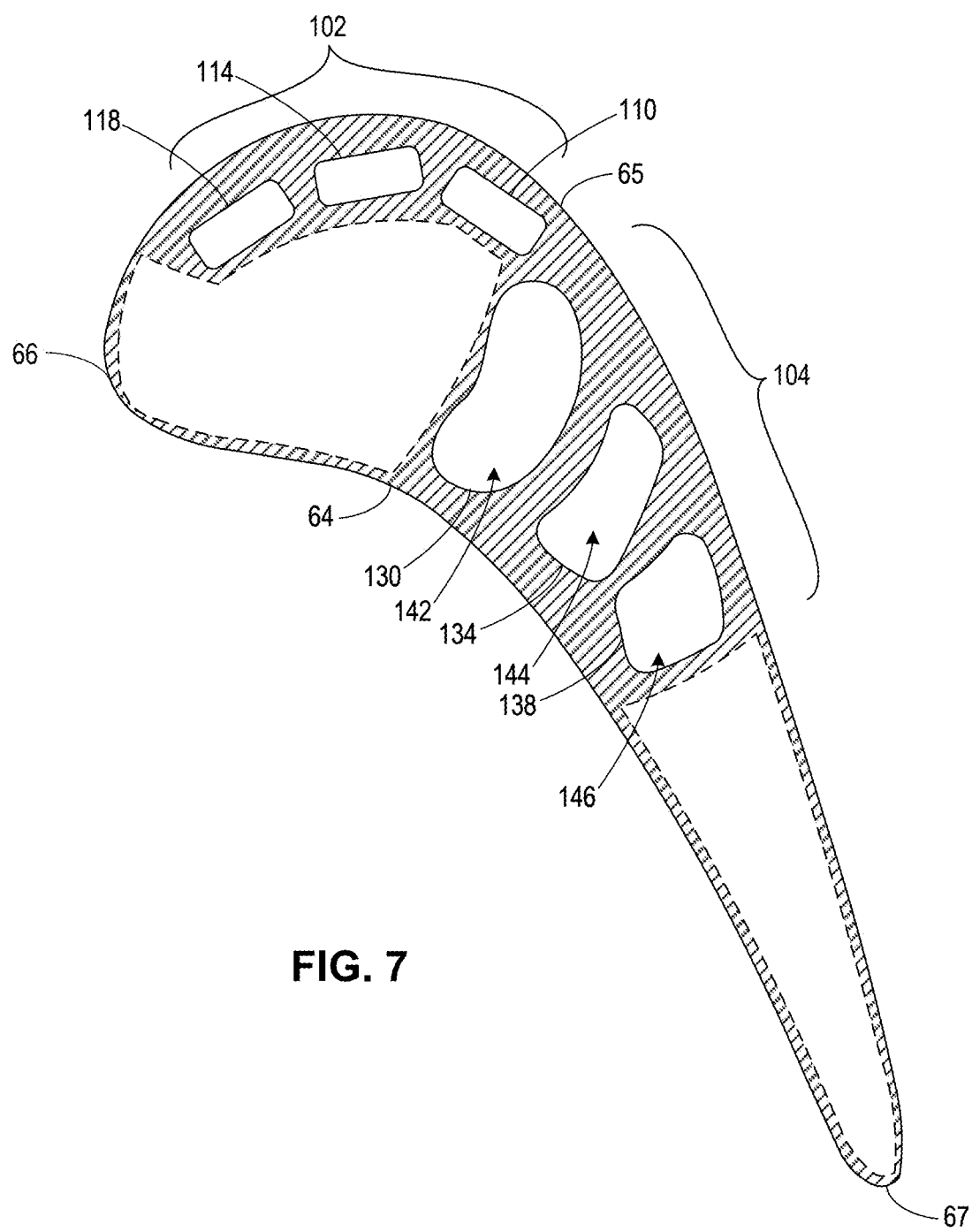
FIG. 7 is a cross-sectional view of the blade assembly of FIG. 3 depicting the cooling circuit.

FIG. 7 is a cross-sectional view of the airfoil 60 of the blade assembly 34 along P6 of FIG. 5. In FIG. 7, the pressure side 64, the suction side 65, the airfoil leading edge 66, and the airfoil trailing edge 67 of the airfoil 60 are labeled. In FIG. 7, the sections 110, 114, 118 of the forward serpentine cooling conduit 102 of FIG. 6 and the sections 130, 134, 138 of the aft serpentine cooling conduit 104 of FIG. 5 are labeled. In FIG. 7, the sections 110, 114, 118 are adjacent to the suction side 65 and offset from the pressure side 64. In FIG. 7, the sections 130, 134, 138 are adjacent to the pressure side 64 and the suction side 65. In FIG. 7, portions of the cross-section of the airfoil 60 include dashed sections. In some examples, some or all of the areas of the dashed sections include other conduits of the cooling circuit 90, such as cooling conduits extending from the leading inlet passages 48l and/or the aft inlet passage 48t.

In FIG. 7, the sections 130, 134, 138 of the aft section have a first cooling conduit portion 142, a second cooling conduit portion 144, and a third cooling conduit portion 146, respectively. As used herein, the quantity (e.g., number) of cooling conduit portions spanning from the pressure surface 64 to the suction surface 65 (denoted "$N_2$") refers to the number of cooling conduit portions fed from the middle inlet passage that span at least 60% of the thickness of the airfoil measured perpendicular to the camber line of the airfoil 60 and from the geometric center of the respective cooling conduit portion. In FIG. 7, the blade assembly 34 includes three cooling conduit portions that span from the pressure surface 64 to the suction surface 65, namely the cooling conduit portions 142, 144, 146.

Figure 8:
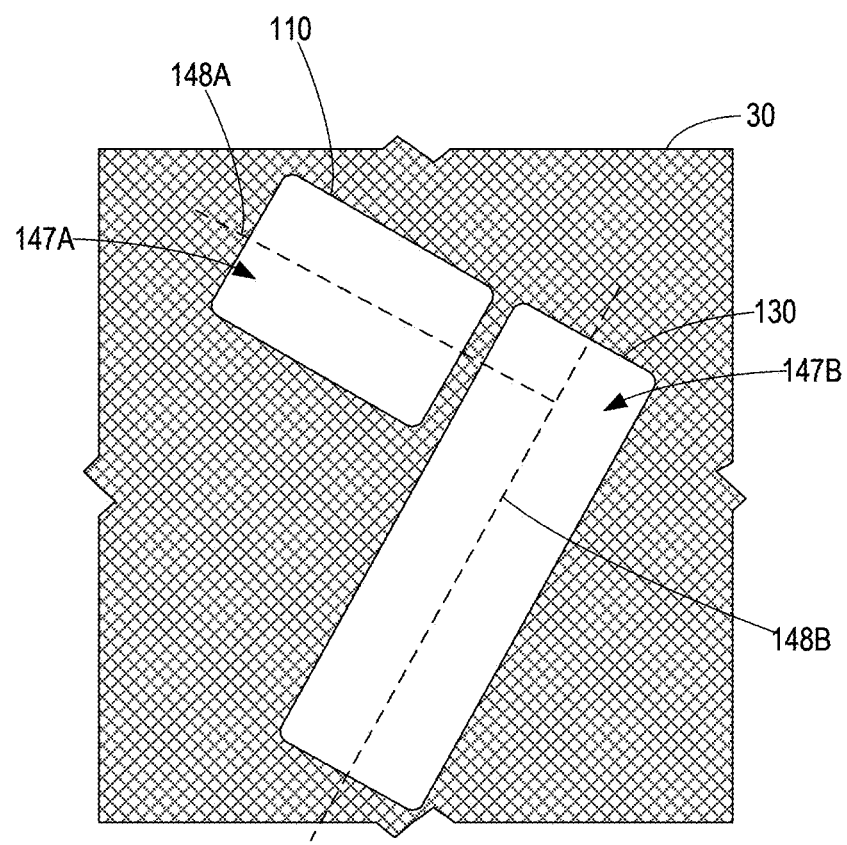
FIG. 8 is a cross-sectional view of a splitter of the cooling circuit of FIG. 6.

FIG. 8 is a cross-sectional view of the blade assembly 30 at the splitter section 100 of FIG. 6 at P6 of FIG. 6. In FIG. 8, the first section 110 of the forward serpentine cooling conduit 102 and the first section 130 of the aft serpentine cooling conduit 104. At P6, the first section 110 of the forward serpentine cooling conduit 102 has a first cross-sectional area 147A and a first major axis 148A. At P6, the first section 130 of the aft serpentine cooling conduit 104 has a second cross-sectional area 147B and a second major axis 148B. In FIG. 8, the major axes 148A, 148B form a general L-shape (e.g., a boomerang shape). In FIG. 8, the first cross-sectional area 147A is less than the second cross-sectional area 147B.

Figure 9:
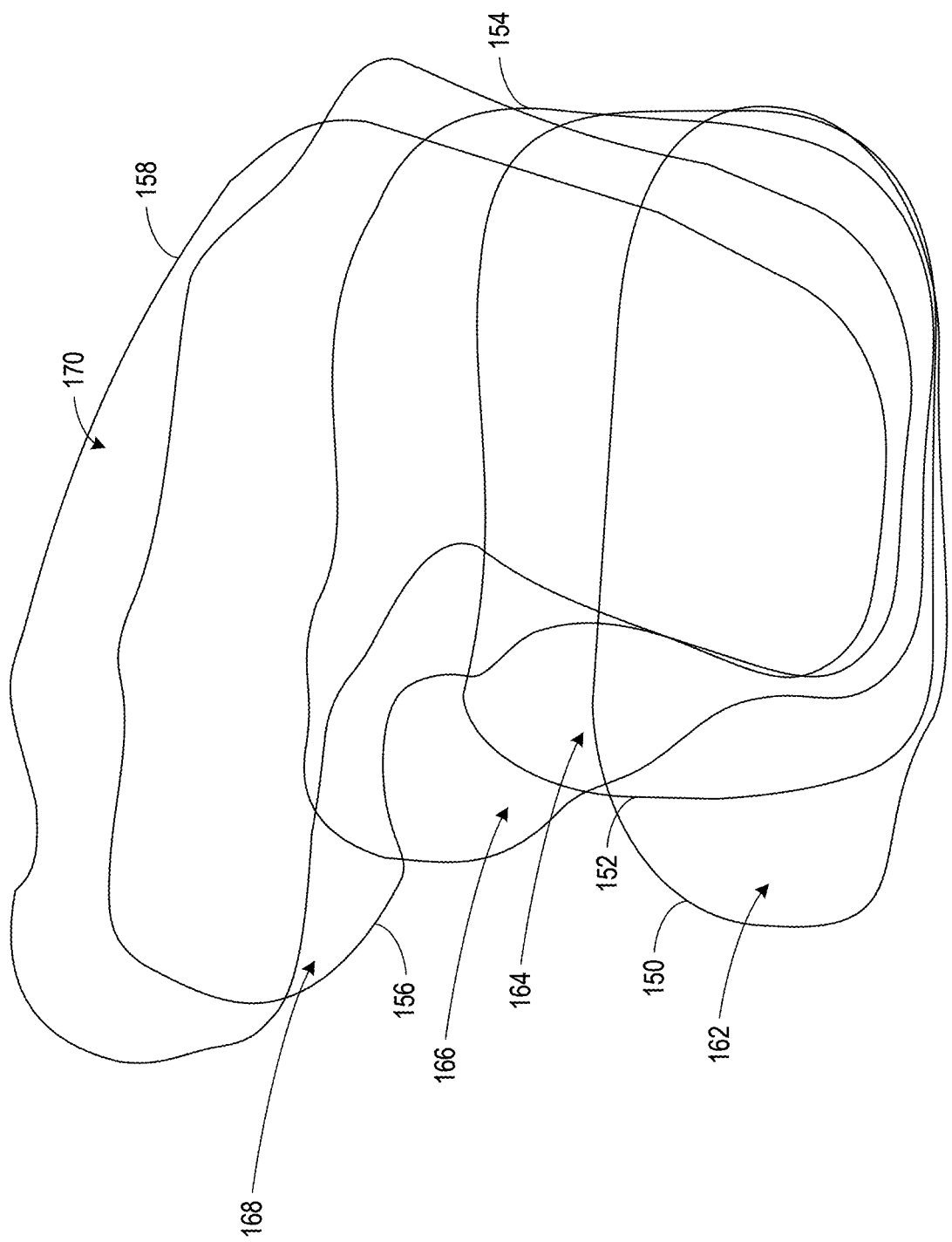
FIG. 9 is a schematic diagram illustrating the cross-sectional shape(s) of the cooling conduit portions of the middle inlet passage of FIG. 3 taken at a plurality of planes of FIG. 5.

FIG. 9 is a schematic diagram illustrating the cross-sectional shape of the middle inlet passage 48m taken at P1, P2, P3, P4, and P5 of FIG. 5. In FIG. 9, the first middle inlet passage 48m defines a first cooling conduit portion 150 at P1, a second cooling conduit portion 152 at P2, a third cooling conduit portion 154 at P3, a fourth cooling conduit portion 156 at P4, and a fifth cooling conduit portion 158 at P5. The first cooling conduit portion 150 has a first cross-sectional area 162, the second cooling conduit portion 152 has a second cross-sectional area 164, the third cooling conduit portion 154 has a third cross-sectional area 166, the fourth cooling conduit portion 156 has a fourth cross-sectional area 168, and the fifth cooling conduit portion 158 has a fifth cross-sectional area 170. As used herein, the maximum normalized cooling conduit portion area (denoted "$A_{max}$") refers to the greatest area of the cross-sectional area 164, 166, 168, 170 normalized by the first cross-sectional area 162. The $A_{max}$ can be calculated by the following equation:

$$A_{max} = \max\left\{\frac{A_i}{A_1}\right\}_{i=2}^{5}$$

where $A_1$ is the first cross-sectional area 162, $A_2$ is the second cross-sectional area 164, $A_3$ is the third cross-sectional area 166, $A_4$ is the fourth cross-sectional area 168, and $A_5$ is the fifth cross-sectional area 170.

Figure 10:
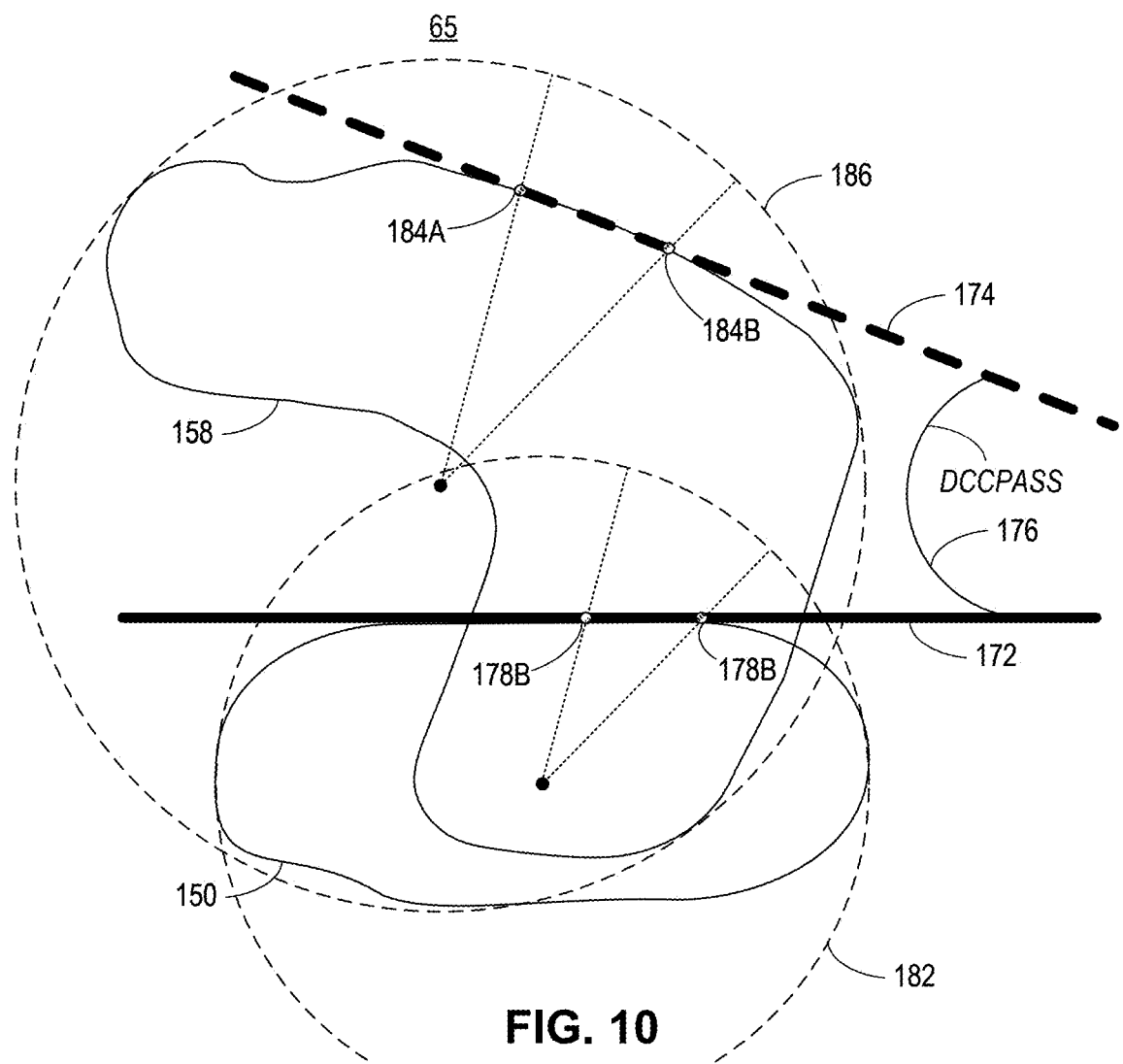
FIG. 10 is a schematic used to calculate a degree of change along the suction side of the middle inlet passage of the blade assembly of FIG. 3.

FIG. 10 is a schematic used to calculate the degree of change along the suction side 176 (denoted "DCCPASS") of the middle inlet passage 48m of the blade assembly 34 of FIG. 3. The DCCPASS 176 is determined between the first cooling conduit portion 150 and the fifth cooling conduit portion 158. To determine the DCCPASS 176, a first line 172 and a second line 174 are marked on the first cooling conduit portion 150 and the fifth cooling conduit portion 158, respectively. The first line 172 is defined between a first point 178A and a second point 178B. To determine the location of the points 178A, 178B, a first bounding circle 180 is drawn around the perimeter of the first cooling conduit portion 150. The first bounding circle 180 is the smallest circle that fully bounds the first cooling conduit portion 150. The first point 178A is the point on the perimeter of the first cooling conduit portion 150 that is spaced 15 degrees from a line extending from a center of the first bounding circle 180 toward the suction side 65 (e.g., the 12:30 o'clock position on the first bounding circle 180, etc.). The second point 178B is the point on the perimeter of the first cooling conduit portion 150 that is spaced 45 degrees from a line extending from a center of the first bounding circle 180 toward the suction side 65 (e.g., the 1:30 o'clock position on the first bounding circle 180, etc.).

The second line 174 is defined between a third point 184A and a fourth point 184B. To determine the location of the points 184A, 184B, a second bounding circle 186 is drawn around the perimeter of the fifth cooling conduit portion 158. The second bounding circle 186 is the smallest circle that fully bounds the fifth cooling conduit portion 158. The third point 184A is the point on the perimeter of the first cooling conduit portion 150 that is spaced 15 degrees from a line extending from a center of the second bounding circle 186 toward the suction side 65 (e.g., the 12:30 o'clock position on the second bounding circle 186, etc.). The fourth point 184B is the point on the perimeter of the fifth cooling conduit portion 158 that is spaced 45 degrees from a line extending from a center of the second bounding circle 186 toward the suction side 65 (e.g., the 1:30 o'clock position on the second bounding circle 186, etc.). The DCCPASS 176 is the angle formed between the first line 172 and the second line 174.

The blade assemblies 30 of the HP turbine 26 and, specifically, the stage one blade assemblies 30 of the HP turbine 26 have the highest flow path temperature of any blade set. These stage one blade assemblies also rotate at extremely high angular velocities. The extreme temperature environment and the high rotational speeds impart large forces on the stage one blade assemblies 30 that can lead to creep and fatigue, especially along the suction side of the airfoil. Creep and fatigue may result in an unexpected or premature part replacement that limits engine Time on Wing (TOW). Therefore, there is a need for a blade assembly with high durability that can withstand these large centrifugal stresses and reduce (e.g., minimize) creep and fatigue.

The inventors created blade assemblies with relatively high durability (e.g., creep and fatigue resistance) for a defined engine operating environment characterized by the redline EGT and the redline CS. The inventors developed multiple blade assembles and determined that it is beneficial to vary the geometry of the middle inlet passage 48m. Further geometry changes to the inlet passage enable control regarding an amount of cooling fluid provided to the cooling conduits. The blade assemblies disclosed herein include cooling conduits and inlet passages that are sized specifically to ensure adequate cooling capabilities while also improving creep and fatigue resistance. The inventors determined that the sizing and shape of the middle inlet passage 48m were a significant cause for creep and fatigue in the airfoil 60. More specifically, the shape and size of the middle inlet passage 48m, such as the DCCPASS 176, the maximum normalized area of the cooling conduit portions 150, 152, 154, 156, 158 for a specific set of operating characteristics.

The inventors determined during the course of their engine design, that the degree of change of cooling conduit portions along suction side DCCPASS, the maximum normalized cooling conduit portion area $A_{max}$, the number of cooling conduits fed by the middle inlet passage 48m N, along with the redline EGT and the redline CS provide engine designs with improved creep and fatigue resistance for the blade assembly 30.

Table 2 below illustrates fourteen examples (denoted Ex. 1-14) of gas turbine engines 10 and blade assemblies 30 developed by the inventors. As stated above, the inventors created solutions (examples 1-10 of Table 2) with relatively high blade durability (e.g., reduced creep and fatigue, absence of crack formation or propagation after a number of engine cycles) for a defined engine environment when compared to solutions without such high blade durability (examples 11-14 of Table 2) . . . . Table 2 includes degree of change of cooling conduit portions along suction side DCCPASS values, the maximum normalized cooling conduit portion area Amax values, the number of cooling conduits fed by the middle inlet passage 48m $N_1$ of FIG. 6, the redline EGT and the redline CS for each of the examples.

TABLE 2

| Parameter Units | DCCPASS Degrees (°) | $A_{Max}$ — | $N_1$ — | Redline EGT ° C. | Redline CS Hz |
|---|---|---|---|---|---|
| Ex. 1 | 21.00 | 1.30 | 2 | 988 | 306.000 |
| Ex. 2 | 33.00 | 2.10 | 2 | 1120 | 353.000 |

TABLE 2-continued

| Parameter Units | DCCPASS Degrees (°) | $A_{Max}$ — | $N_1$ — | Redline EGT ° C. | Redline CS Hz |
|---|---|---|---|---|---|
| Ex. 3 | 31.06 | 1.72 | 2 | 1070.61 | 344.762 |
| Ex. 4 | 23.97 | 1.95 | 2 | 1087.64 | 315.211 |
| Ex. 5 | 30.41 | 2.08 | 2 | 995.84 | 309.763 |
| Ex. 6 | 27.92 | 1.67 | 2 | 1104.55 | 334.537 |
| Ex. 7 | 22.00 | 1.34 | 2 | 991.75 | 326.512 |
| Ex. 8 | 32.80 | 1.96 | 2 | 1007.14 | 340.826 |
| Ex. 9 | 23.01 | 2.07 | 2 | 1001.54 | 334.970 |
| Ex. 10 | 22.90 | 1.88 | 2 | 1090.11 | 350.486 |
| Ex. 11 | 11.59 | 1.88 | 2 | 1067.59 | 316.085 |
| Ex. 12 | 10.90 | 2.04 | 2 | 991.77 | 331.692 |
| Ex. 13 | 8.54 | 1.55 | 2 | 1104.02 | 322.535 |
| Ex. 14 | 12.70 | 1.63 | 2 | 1067.54 | 318.598 |

The inventors found that blade assembly designs with parameters defined in Examples 1-10 exhibit relatively high structural integrity and durability while remaining within current engine constraints. Conversely, Examples 11-14 have relatively low durability for the particular engine environment.

The examples developed by the inventors shown in Table 2 can be characterized by an Expression (EQ) that can be used to distinguish those designs in Examples 1-10 that meet the performance (durability) requirements from those designs in Examples 11-14 that do not meet the performance requirements. As such, the Expression (EQ) can be used to identify an improved blade assembly design, better suited for a particular engine operating environment and taking into account the constraints imposed on blade assembly design with cooling holes used in such a system.

The Expression (EQ) is defined as:

$$EQ = 0.75 * \left(\frac{DCCPASS(°)}{2°}\right)^2 * \left(\frac{A_{max}}{1.7}\right) * \left(\frac{N_1}{0.1}\right)^{-1} * \left(\frac{\text{Redline } EGT(° \text{ C.})}{193° \text{ C.}}\right)^2 * \left(\frac{\text{Redline } CS \text{ (Hz)}}{1000 \text{ Hz}}\right),$$

in which DCCPASS refers to the degree of change along the suction side of the middle inlet passage 48m. $A_{max}$ refers to the maximum cross-sectional area of the middle inlet passage 48m at P2, P3, P4, P5 and P6 of FIG. 6 normalized to the cross-sectional area of the middle inlet passage 48m at P1. $N_1$ refers to the number of cooling conduits fed by the middle inlet passage 48m of the blade assembly 30. Redline EGT represents the redline exhaust gas temperature, or the maximum operating temperature for the gas turbine engine 10 measured at a particular location within the gas turbine engine 10. Redline CS represents the redline core speed of the engine and in turn the rotational speed of the blade assembly 30, measured in units of Hertz. The redline core speed CS can differ based on engine design limits and operational parameters.

Values for the Expression (EQ) for each of the examples of Table 2 are shown in Table 3.

TABLE 3

| Parameter Units | DCCPASS Degrees (°) | $A_{Max}$ — | $N_1$ — | Redline EGT ° C. | Redline CS Hz | EQ — |
|---|---|---|---|---|---|---|
| Ex. 1 | 21.00 | 1.30 | 2 | 988 | 306.000 | 25.353 |
| Ex. 2 | 33.00 | 2.10 | 2 | 1120 | 353.000 | 149.922 |

TABLE 3-continued

| Parameter Units | DCCPASS Degrees (°) | $A_{Max}$ — | $N_1$ — | Redline EGT ° C. | Redline CS Hz | EQ — |
|---|---|---|---|---|---|---|
| Ex. 3 | 31.06 | 1.72 | 2 | 1070.61 | 344.762 | 97.078 |
| Ex. 4 | 23.97 | 1.95 | 2 | 1087.64 | 315.211 | 61.851 |
| Ex. 5 | 30.41 | 2.08 | 2 | 995.84 | 309.763 | 87.481 |
| Ex. 6 | 27.92 | 1.67 | 2 | 1104.55 | 334.537 | 78.663 |
| Ex. 7 | 22.00 | 1.34 | 2 | 991.75 | 326.512 | 30.813 |
| Ex. 8 | 32.80 | 1.96 | 2 | 1007.14 | 340.826 | 107.925 |
| Ex. 9 | 23.01 | 2.07 | 2 | 1001.54 | 334.970 | 54.52 | systems without requiring the creation of new engine parts capable of holding the blade assembly 30. This provides for improving current engine durability without increasing costs to prepare new engines or further adapt existing engines.

Table 4 below illustrates minimum and maximum values for the degree of change of cooling conduit portions along suction side DCCPASS, the max normalized cooling conduit portion area $A_{max}$, the number of cooling conduits fed by middle inlet passage 48*m* $N_1$, the redline exhaust gas temperature EGT, and the redline core speed CS along with a range of values for Expression (EQ) suited for a blade assembly that meets the durability requirements.

TABLE 4

| Parameter: | Engine Element: | Minimum: | Maximum: | Units: |
|---|---|---|---|---|
| DCCPASS | Degree of Change of the Cooling Conduit Portions along the Suction Side | 21.00 | 33.00 | Degrees (°) |
| $A_{Max}$ | Max Normalized Cooling Conduit Portion Area | 1.30 | 2.10 | — |
| $N_1$ | No. of Cooling Conduits Fed by the Middle Inlet Passage | 2 | 2 | — |
| EGT | Exhaust Gas Temperature | 988 | 1120 | Degrees Celsius (° C.) |
| CS | Core Speed | 306 | 353 | Hertz (Hz) |
| EQ | Expression | 25.353 | 149.922 | n/a |

TABLE 3-continued

| Parameter Units | DCCPASS Degrees (°) | $A_{Max}$ — | $N_1$ — | Redline EGT ° C. | Redline CS Hz | EQ — |
|---|---|---|---|---|---|---|
| Ex. 10 | 22.90 | 1.88 | 2 | 1090.11 | 350.486 | 60.792 |
| Ex. 11 | 11.59 | 1.88 | 2 | 1067.59 | 316.085 | 13.469 |
| Ex. 12 | 10.90 | 2.04 | 2 | 991.77 | 331.692 | 11.707 |
| Ex. 13 | 8.54 | 1.55 | 2 | 1104.02 | 322.535 | 6.579 |
| Ex. 14 | 12.70 | 1.63 | 2 | 1067.54 | 318.598 | 14.132 |

Based on the Expression (EQ) values of Examples 1-10 in Table 3, it was determined that gas turbine engine and blade assembly designs with an EQ value in the range of 25.353 to 149.922 (i.e., 25.353≤EQ≤149.922) advantageously meet the durability requirements while remaining within desired tolerances and being capable of use in existing engine systems.

Benefits are realized when the manufactured component including the blade assembly 30 has a geometry where Expression (EQ) falls within the range 25.353 to 149.922 (i.e., 25.353≤EQ≤149.922). Such benefits include a reduction in stress in the airfoil and shank and an improvement in blade cooling, which increases the lifetime of the blade assembly 30 and therefore extends the time between a need for replacement parts. This provides for increased durability for the blade assembly 30, which decreases required maintenance and costs, while increasing overall engine reliability.

Further still, the benefits included herein provide for a blade assembly 30 that fits within existing engines. For example, the values for Expression (EQ) as provided herein take existing engines into consideration, permitting replacement of current blade assemblies with replacement blade assemblies (or new blade assemblies) having the parameters of the blade assembly 30 described herein. Such consideration provides for replacing and improving current engine systems without requiring the creation of new engine parts capable of holding the blade assembly 30. This provides for improving current engine durability without increasing costs to prepare new engines or further adapt existing engines.

Additional benefits associated with the blade assembly 30 with a middle inlet passage 48*m* described herein include a quick assessment of design parameters in terms of blade assembly size and cooling conduit geometry, engine operational conditions, and blade assembly and vane assembly numbers for engine design and particular blade assembly design. Narrowing these multiple factors to a region of possibilities saves time, money, and resources. The blade assembly 30 with the middle inlet passage 48*m* described herein enables the development and production of high-performance turbine engines and blades across multiple performance metrics within a given set of constraints.

As noted above, designs such as Examples 11-14 of Tables 2 and 3 were found to have relatively low durability for a particular engine environment. This is reflected in the associated Expression (EQ) value outside the range of 25.353 to 149.92. Lower durability results in less time on wing (TOW) and greater maintenance costs.

Additionally or alternatively, designs outside the range of EQ may attempt to increase durability by making sacrifices in terms of weight, aerodynamic performance, and efficiency. For example, the standard practice for solving the problem of improving blade assembly durability has been to utilize stronger material. However, such materials lead to increased costs, system weight, and overall space occupied by the blade assembly. With a material-driven solution, the overall engine efficiency may be reduced and related components may have to be redesigned to compensate for the stronger materials. In some cases, this result of such a redesign is impractical or impossible. Therefore, a solution for reducing stresses located in airfoils presently used in existing engines is needed, without requiring redesign of related components or without sacrificing overall engine efficiency.

In other examples, increasing size of the airfoil or related components, utilizing stronger material, and/or providing additional cooling features can combat centrifugal and thermal stresses. However, such increased size, stronger materials, and additional cooling features can lead to increased costs, system weight, overall space occupied by the blade assembly, and performance loss (e.g., higher specific fuel consumption, etc.), as well as increased local stresses at the cooling conduits due to increased weight and size relating to the centrifugal forces. Increased cooling features results in a relatively less amount of material utilized, which can result in an increase in local stresses at the cooling conduits. Therefore, a solution for reducing stress at the cooling conduits is needed without otherwise increasing stress(es), weight, size, or decreasing engine efficiency.

As disclosed above, the inventors have found that the Examples 1-10 of Tables 2 and 3 provide successful solutions without the need to increase thickness, weight, strength, or the number of cooling features. The Examples 1-10 of Tables 2 and 3 illustrate that designs having an Expression (EQ) value from range 25.353 to 149.922 (i.e., 25.353≤EQ≤149.92) achieve increased durability without penalties to size, weight, strength, or stress through the use of additional cooling features. In other words, rather than using heavier, stronger materials, or adding additional cooling features, effective stress reduction can be achieved by the Examples 1-10 of Tables 2 and 3.

As disclosed above, the inventors created blade assemblies with relatively high durability (e.g., creep and fatigue resistance) for a defined engine operating environment.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A gas turbine engine, comprising an engine core configured to generate a redline exhaust gas temperature (EGT) in a range of 988 Celsius (° C.) to 1120° C. and having a redline core speed (CS) in a range of 306 Hertz to 353 Hertz, the engine core extending along an engine centerline and including a compressor section, a combustor, and a turbine section, the turbine section including a blade assembly rotatable about the engine centerline, the blade assembly comprising a platform having an upper surface and a lower surface, an airfoil extending from the upper surface of the platform, the airfoil having an exterior surface, the exterior surface defining a pressure side and a suction side, the airfoil including a leading-edge and a trailing-edge, a shank extending from the lower surface, the shank having a base defining a base plane, a middle inlet passage located within the shank, the middle inlet passage having a first cooling conduit portion at a first plane radially spaced 0.0167 meters from the base plane, the first cooling conduit portion having a first cross-sectional area, the first cooling portion defining a first bounding circle, the first cooling portion having a first point at a first 12:30 o'clock position on the first bounding circle, and a second point at a first 1:30 o'clock position on the first bounding circle, the first point and the second point defining a first line, a second cooling conduit portion at a second plane radially spaced 0.0197 meters from the base plane, the second cooling conduit portion having a second cross-sectional area, a third cooling conduit portion at a third plane radially spaced 0.0215 meters from the base plane, the third cooling conduit portion having a third cross-sectional area, a fourth cooling conduit portion at a fourth plane radially spaced 0.0234 meters from the base plane, the fourth cooling conduit portion having a fourth cross-sectional area, a fifth cooling conduit portion at a fifth plane radially spaced 0.0245 meters from the base plane, the fifth cooling conduit portion having a fifth cross-sectional area, the fifth cooling portion defining a second bounding circle, the second cooling portion having a third point at a second 12:30 o'clock position on the second bounding circle, and a fourth point at a third 1:30 o'clock position on the second bounding circle, the third point and the fourth point defining a second line, wherein the middle inlet passage defines a maximum normalized cooling conduit portion area ($A_{max}$) between 1.30 and 2.10, $A_{max}$ defined by $$A_{max} = \max\left\{\frac{A_i}{A_1}\right\}_{i=2}^{5}$$

wherein the first line and the second line define a degree of change of the cooling conduit portions along the suction side (DCCPASS) ranging between 21.0 and 33.0 degrees) (°, and a plurality of cooling conduits located within the airfoil, the plurality of cooling conduits including a quantity ($N_1$) of cooling conduits fed by the middle inlet passage, wherein the quantity is 2, and wherein:

$$25.353 \leq 0.75 * \left(\frac{DCCPASS(°)}{2°}\right)^2 * \left(\frac{A_{max}}{1.7}\right) * \left(\frac{N_1}{0.1}\right)^{-1} *$$
$$\left(\frac{\text{Redline } EGT(° \text{ C.})}{193° \text{ C.}}\right)^2 * \left(\frac{\text{Redline } CS \text{ (Hz)}}{1000 \text{ Hz}}\right) \leq 149.922.$$

The gas turbine engine of any preceding clause, further including a plurality of inlet passages located within the shank, the plurality of inlet passages including the middle inlet passage.

The gas turbine engine of any preceding clause, wherein each of the inlet passages extends between the base and one or more of the plurality of cooling conduits.

The gas turbine engine of any preceding clause, wherein the plurality of inlet passages further includes a leading-edge inlet passage and a trailing-edge inlet passage.

The gas turbine engine of any preceding clause, wherein the shank is configured as a dovetail.

The gas turbine engine of any preceding clause, wherein the blade assembly is a stage one blade assembly of a high pressure turbine of the turbine section.

The gas turbine engine of any preceding clause, wherein the quantity ($N_1$) of cooling conduits fed by the middle inlet passage includes a forward serpentine cooling conduit in the airfoil, and an aft serpentine cooling conduit in the airfoil.

The gas turbine engine of any preceding clause, wherein the middle inlet passage is fluidly coupled to the forward serpentine cooling conduit and the aft serpentine cooling conduit at a splitter, the splitter including a first cooling conduit portion at a sixth plane radially spaced 0.449 meters from the base plane, the first cooling conduit portion associated the forward serpentine cooling conduit, the first cooling conduit portion having a first major axis, and a second cooling conduit portion at the sixth plane, the second cooling conduit portion associated with the aft serpentine cooling conduit, the second cooling conduit portion having a second major axis, wherein the first major axis and the second major axis define an L-shape.

The gas turbine engine of any preceding clause, wherein the quantity is a first quantity, the forward serpentine cooling conduit defines a second quantity of cooling conduit portions spanning pressure surface to suction surface, the cooling conduit portions taken at a sixth plane radially spaced 0.449 meters from the base plane, and the second quantity is three.

A blade assembly for a gas turbine engine having an engine core configured to generate a redline exhaust gas temperature (EGT) in a range of 988 Celsius (° C.) to 1120° C. and having a redline core speed (CS) in a range of 306 Hertz to 353 Hertz, the blade assembly to be connected to the engine core and rotatable about an engine centerline of the engine core, the blade assembly comprising a platform having an upper surface and a lower surface, an airfoil extending from the upper surface of the platform, the airfoil defining an exterior surface, the exterior surface defining a pressure side and a suction side, the airfoil including a leading-edge and a trailing-edge, a shank extending from the lower surface, the shank having a base defining a base plane, a middle inlet passage located within the shank, the middle inlet passage having a first cooling conduit portion at a first plane radially spaced 0.0167 meters from the base plane, the first cooling conduit portion having a first cross-sectional area, the first cooling conduit portion having a first cross-sectional area, the first cooling portion defining a first bounding circle, the first cooling portion having a first point at a first 12:30 o'clock position on the first bounding circle, and a second point at a first 1:30 o'clock position on the first bounding circle, the first point and the second point defining a first line, a second cooling conduit portion at a second plane radially spaced 0.0197 meters from the base plane, the second cooling conduit portion having a second cross-sectional area, a third cooling conduit portion at a third plane radially spaced 0.0215 meters from the base plane, the third cooling conduit portion having a third cross-sectional area, a fourth cooling conduit portion at a fourth plane radially spaced 0.0234 meters from the base plane, the fourth cooling conduit portion having a fourth cross-sectional area, a fifth cooling conduit portion at a fifth plane radially spaced 0.0245 meters from the base plane, the fifth cooling conduit portion having a fifth cross-sectional area, the fifth cooling portion defining a second bounding circle, the second cooling portion having a third point at a second 12:30 o'clock position on the second bounding circle, and a fourth point at a third 1:30 o'clock position on the second bounding circle, the third point and the fourth point defining a second line, wherein the middle inlet passage defines a maximum normalized cooling conduit portion area ($A_{max}$) ranging between 1.30 and 2.10, $A_{max}$ defined by $$A_{max} = \max\left\{\frac{A_i}{A_1}\right\}^5_{i=2}$$

wherein the first line and the second line define a degree of change of the cooling conduit portions along the suction side (DCCPASS) ranging between 21.0 and 33.0 degrees) (°, and a plurality of cooling conduits located within the airfoil, the plurality of cooling conduits including a quantity ($N_1$) of cooling conduits fed by the middle inlet passage, wherein the quantity is 2, and wherein:

$$25.353 \leq 0.75 * \left(\frac{DCCPASS(°)}{2°}\right)^2 * \left(\frac{A_{max}}{1.7}\right) * \left(\frac{N_1}{0.1}\right)^{-1} *$$
$$\left(\frac{\text{Redline } EGT(° C.)}{193° C.}\right)^2 * \left(\frac{\text{Redline } CS\,(\text{Hz})}{1000\ \text{Hz}}\right) \leq 149.922.$$

The blade assembly of any preceding clause, further including a plurality of inlet passages located within the shank, the plurality of inlet passages including the middle inlet passage.

The blade assembly of any preceding clause, wherein each of the inlet passages extends between the base and one or more of the plurality of cooling conduits.

The blade assembly of any preceding clause, wherein the plurality of inlet passages further includes a leading-edge inlet passage and a trailing-edge inlet passage.

The blade assembly of any preceding clause, wherein the shank is configured as a dovetail.

The blade assembly of any preceding clause, wherein the blade assembly is a stage one blade assembly of a high pressure turbine of the gas turbine engine.

The blade assembly of any preceding clause, wherein the quantity ($N_1$) of cooling conduits fed by the middle inlet passage includes a forward serpentine cooling conduit in the airfoil and an aft serpentine cooling conduit in the airfoil.

The blade assembly of any preceding clause, wherein the middle inlet passage is fluidly coupled to the forward serpentine cooling conduit and the aft serpentine cooling conduit at a splitter, the splitter including a first cooling conduit portion at a sixth plane radially spaced 0.449 meters from the base plane, the first cooling conduit portion associated with the forward serpentine cooling conduit, the first cooling conduit portion having a first major axis, and a second cooling conduit portion at the sixth plane, the second cooling conduit portion associated with the aft serpentine cooling conduit, the second cooling conduit portion having a second major axis, wherein the first major axis and the second major axis define an L-shape.

The blade assembly of any preceding clause, wherein the quantity is a first quantity, the forward serpentine cooling conduit defines a second quantity of cooling conduit portions spanning pressure surface to suction surface, the cooling conduit portions taken at a sixth plane radially spaced 0.449 meters from the base plane, and the second quantity is three.

The following claims are hereby incorporated into this Detailed Description by this reference, with each claim standing on its own as a separate embodiment of the present disclosure.

What is claimed is:

1. A gas turbine engine, comprising:
   an engine core configured to generate a redline exhaust gas temperature (EGT) in a range of 988 Celsius (° C.) to 1120° C. and having a redline core speed (CS) in a range of 306 Hertz to 353 Hertz, the engine core extending along an engine centerline and including:
   a compressor section;
   a combustor; and a turbine section, the turbine section including a blade assembly rotatable about the engine centerline, the blade assembly comprising:
  a platform having an upper surface and a lower surface;
  an airfoil extending from the upper surface of the platform, the airfoil having an exterior surface, the exterior surface defining a pressure side and a suction side, the airfoil including a leading-edge and a trailing-edge;
  a shank extending from the lower surface, the shank having a base defining a base plane;
  a middle inlet passage located within the shank, the middle inlet passage having:
    a first cooling conduit portion at a first plane radially spaced 0.0167 meters from the base plane, the first cooling conduit portion having a first cross-sectional area, the first cooling portion defining a first bounding circle, the first cooling portion having:
      a first point at a first 12:30 o'clock position on the first bounding circle; and
      a second point at a first 1:30 o'clock position on the first bounding circle, the first point and the second point defining a first line;
    a second cooling conduit portion at a second plane radially spaced 0.0197 meters from the base plane, the second cooling conduit portion having a second cross-sectional area;
    a third cooling conduit portion at a third plane radially spaced 0.0215 meters from the base plane, the third cooling conduit portion having a third cross-sectional area;
    a fourth cooling conduit portion at a fourth plane radially spaced 0.0234 meters from the base plane, the fourth cooling conduit portion having a fourth cross-sectional area;
    a fifth cooling conduit portion at a fifth plane radially spaced 0.0245 meters from the base plane, the fifth cooling conduit portion having a fifth cross-sectional area, the fifth cooling portion defining a second bounding circle, the fifth cooling portion having:
      a third point at a second 12:30 o'clock position on the second bounding circle; and
      a fourth point at a third 1:30 o'clock position on the second bounding circle, the third point and the fourth point defining a second line;
    wherein the middle inlet passage defines a maximum normalized cooling conduit portion area ($A_{max}$) between 1.30 and 2.10, $A_{max}$ defined by:

$$A_{max} = \max\left\{\frac{A_i}{A_1}\right\}_{i=2}^{5}$$

wherein the first line and the second line define a degree of change of the first, second, third, fourth, and fifth cooling conduit portions along the suction side (DCCPASS) ranging between 21.0 and 33.0 degrees (°); and
  a plurality of cooling conduits located within the airfoil, the plurality of cooling conduits including a quantity ($N_1$) of cooling conduits fed by the middle inlet passage, wherein the quantity is 2, and wherein:

$$25.353 \leq 0.75 * \left(\frac{DCCPASS(°)}{2°}\right)^2 * \left(\frac{A_{max}}{1.7}\right) * \left(\frac{N_1}{0.1}\right)^{-1} *$$
$$\left(\frac{\text{Redline } EGT(° \text{ C.})}{193° \text{ C.}}\right)^2 * \left(\frac{\text{Redline } CS\,(\text{Hz})}{1000\text{ Hz}}\right) \leq 149.922.$$

2. The gas turbine engine of claim 1, further including a plurality of inlet passages located within the shank, the plurality of inlet passages including the middle inlet passage.

3. The gas turbine engine of claim 2, wherein each of the inlet passages extends between the base and one or more of the plurality of cooling conduits.

4. The gas turbine engine of claim 2, wherein the plurality of inlet passages further includes a leading-edge inlet passage and a trailing-edge inlet passage.

5. The gas turbine engine of claim 1, wherein the shank is configured as a dovetail.

6. The gas turbine engine of claim 1, wherein the blade assembly is a stage one blade assembly of a high pressure turbine of the turbine section.

7. The gas turbine engine of claim 1, wherein the quantity ($N_1$) of cooling conduits fed by the middle inlet passage includes:
  a forward serpentine cooling conduit in the airfoil; and
  an aft serpentine cooling conduit in the airfoil.

8. The gas turbine engine of claim 7, wherein the middle inlet passage is fluidly coupled to the forward serpentine cooling conduit and the aft serpentine cooling conduit at a splitter, the splitter including:
  a first cooling conduit portion at a sixth plane radially spaced 0.449 meters from the base plane, the first cooling conduit portion associated with the forward serpentine cooling conduit, the first cooling conduit portion having a first major axis; and
  a second cooling conduit portion at the sixth plane, the second cooling conduit portion associated with the aft serpentine cooling conduit, the second cooling conduit portion having a second major axis, wherein:
  the first major axis and the second major axis define an L-shape.

9. The gas turbine engine of claim 7, wherein the quantity is a first quantity, the forward serpentine cooling conduit defines a second quantity of cooling conduit portions spanning from the pressure surface to suction surface, the cooling conduit portions taken at a sixth plane radially spaced 0.449 meters from the base plane, and the second quantity is three.

10. A blade assembly for a gas turbine engine having an engine core configured to generate a redline exhaust gas temperature (EGT) in a range of 988 Celsius (° C.) to 1120° C. and having a redline core speed (CS) in a range of 306 Hertz to 353 Hertz, the blade assembly to be connected to the engine core and rotatable about an engine centerline of the engine core, the blade assembly comprising:
  a platform having an upper surface and a lower surface;
  an airfoil extending from the upper surface of the platform, the airfoil defining an exterior surface, the exterior surface defining a pressure side and a suction side, the airfoil including a leading-edge and a trailing-edge;
  a shank extending from the lower surface, the shank having a base defining a base plane;
  a middle inlet passage located within the shank, the middle inlet passage having:
    a first cooling conduit portion at a first plane radially spaced 0.0167 meters from the base plane, the first cooling conduit portion having a first cross-sectional area, the first cooling portion defining a first bounding circle, the first cooling portion having:
  a first point at a first 12:30 o'clock position on the first bounding circle; and
  a second point at a first 1:30 o'clock position on the first bounding circle, the first point and the second point defining a first line;
a second cooling conduit portion at a second plane radially spaced 0.0197 meters from the base plane, the second cooling conduit portion having a second cross-sectional area;
a third cooling conduit portion at a third plane radially spaced 0.0215 meters from the base plane, the third cooling conduit portion having a third cross-sectional area;
a fourth cooling conduit portion at a fourth plane radially spaced 0.0234 meters from the base plane, the fourth cooling conduit portion having a fourth cross-sectional area;
a fifth cooling conduit portion at a fifth plane radially spaced 0.0245 meters from the base plane, the fifth cooling conduit portion having a fifth cross-sectional area, the fifth cooling portion defining a second bounding circle, the fifth cooling portion having:
  a third point at a second 12:30 o'clock position on the second bounding circle; and
  a fourth point at a third 1:30 o'clock position on the second bounding circle, the third point and the fourth point defining a second line;
wherein the middle inlet passage defines a maximum normalized cooling conduit portion area ($A_{max}$) between 1.30 and 2.10, $A_{max}$ defined by:

$$A_{max} = \max\left\{\frac{A_i}{A_1}\right\}_{i=2}^{5}$$

wherein the first line and the second line define a degree of change of the first, second, third, fourth, and fifth cooling conduit portions along the suction side (DCCPASS) ranging between 21.0 and 33.0 degrees) (°); and
a plurality of cooling conduits located within the airfoil, the plurality of cooling conduits including a quantity ($N_1$) of cooling conduits fed by the middle inlet passage, wherein the quantity is 2, and wherein:

$$25.353 \leq 0.75 * \left(\frac{DCCPASS(°)}{2°}\right)^2 * \left(\frac{A_{max}}{1.7}\right) * \left(\frac{N_1}{0.1}\right)^{-1} * \left(\frac{\text{Redline } EGT(° \text{ C.})}{193° \text{ C.}}\right)^2 * \left(\frac{\text{Redline } CS \text{ (Hz)}}{1000 \text{ Hz}}\right) \leq 149.922.$$

11. The blade assembly of claim 10, further including a plurality of inlet passages located within the shank, the plurality of inlet passages including the middle inlet passage.

12. The gas turbine engine of claim 11, wherein each of the inlet passages extends between the base and one or more of the plurality of cooling conduits.

13. The gas turbine engine of claim 11, wherein the plurality of inlet passages further includes a leading-edge inlet passage and a trailing-edge inlet passage.

14. The blade assembly of claim 10, wherein the shank is configured as a dovetail.

15. The blade assembly of claim 10, wherein the blade assembly is a stage one blade assembly of a high pressure turbine of the gas turbine engine.

16. The blade assembly of claim 10, wherein the quantity ($N_1$) of cooling conduits fed by the middle inlet passage includes:
  a forward serpentine cooling conduit in the airfoil; and
  an aft serpentine cooling conduit in the airfoil.

17. The blade assembly of claim 16, wherein the middle inlet passage is fluidly coupled to the forward serpentine cooling conduit and the aft serpentine cooling conduit at a splitter, the splitter including:
  a first cooling conduit portion at a sixth plane radially spaced 0.449 meters from the base plane, the first cooling conduit portion associated with the forward serpentine cooling conduit, the first cooling conduit portion having a first major axis; and
  a second cooling conduit portion at the sixth plane, the second cooling conduit portion associated with the aft serpentine cooling conduit, the second cooling conduit portion having a second major axis, wherein:
  the first major axis and the second major axis define an L-shape.

18. The blade assembly of claim 16, wherein the quantity is a first quantity, the forward serpentine cooling conduit defines a second quantity of cooling conduit portions spanning from the pressure surface to suction surface, the cooling conduit portions taken at a sixth plane radially spaced 0.449 meters from the base plane, and the second quantity is three.

* * * * *